United States Patent
Galvin

[11] Patent Number: 6,119,679
[45] Date of Patent: Sep. 19, 2000

[54] SUPPORT HOUSING FOR PORTABLE GRILL

[76] Inventor: Thomas A. Galvin, 10101 S. Komensky, Oak Lawn, Ill. 60453

[21] Appl. No.: 09/301,743

[22] Filed: Apr. 29, 1999

[51] Int. Cl.[7] ................. A47J 37/00; F24C 1/16
[52] U.S. Cl. ............... 126/41 R; 126/25 R; 126/9 R; 99/450; 62/457.1; 206/549
[58] Field of Search ................. 126/9 R, 25 R, 126/41 R, 29, 9 A, 9 B; 220/4.27, 23.83, 4.04; 62/457.1; 206/549, 542; 99/450, 482

[56] References Cited

U.S. PATENT DOCUMENTS

| | | | |
|---|---|---|---|
| 1,665,238 | 4/1928 | Turan | 220/4.27 |
| 2,513,580 | 7/1950 | Milligan | 126/25 R |
| 3,382,863 | 5/1968 | Katz | 126/25 R |
| 3,450,123 | 6/1969 | Tidd | 126/25 R |
| 3,606,066 | 9/1971 | Anderson | 126/25 R |
| 3,714,937 | 2/1973 | Linstead | 126/25 R |
| 4,078,701 | 3/1978 | Clubb | 220/130 |
| 4,403,483 | 9/1983 | Lisalda | 62/459 |
| 4,498,452 | 2/1985 | Schlosser et al. | 126/25 R |
| 4,535,749 | 8/1985 | Schlosser et al. | 126/25 R |
| 4,630,593 | 12/1986 | Gremillion | 126/25 R |
| 4,741,322 | 5/1988 | Lin | 126/25 R |
| 4,763,640 | 8/1988 | Schnack et al. | 126/25 R |
| 5,159,917 | 11/1992 | Archer et al. | 126/25 R |
| 5,363,977 | 11/1994 | Hoff | 126/25 R |
| 5,720,272 | 2/1998 | Chiang | 126/9 R |
| 5,960,788 | 10/1999 | Bach et al. | 126/9 R |

*Primary Examiner*—Ira S. Lazarus
*Assistant Examiner*—David Lee

[57] ABSTRACT

A support housing for portable grill for storing and supporting a grill in a spaced apart relation from a ground surface. The support housing for portable grill includes a housing that has a base panel and a peripheral sidewall upwardly extending from the base panel. The peripheral sidewall defines an interior of the housing. A base portion of the grill is insertable in the interior of the housing. An upper rim of the grill is positioned towards an upper rim of the housing.

6 Claims, 2 Drawing Sheets

SUPPORT HOUSING FOR PORTABLE GRILL

BACKGROUND OF THE INVENTION

1. Field of the Invention

The present invention relates to grill stand and more particularly pertains to a new support housing for portable grill for storing and supporting a grill in a spaced apart relation from a ground surface.

2. Description of the Prior Art

The use of grill stand is known in the prior art. More specifically, grill stand heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 289,458; U.S. Pat. No. 2,718,845; U.S. Pat. No. 3,611,912; U.S. Pat. No. 4,878,476; U.S. Pat. No. 2,565,000; and U.S. Pat. No. 2,379,239.

While these devices fulfill their respective, particular objectives and requirements, the aforementioned patents do not disclose a new support housing for portable grill. The inventive device includes a housing that has a base panel and a peripheral sidewall upwardly extending from the base panel. The peripheral sidewall defines an interior of the housing. A base portion of the grill is insertable in the interior of the housing. An upper rim of the grill is positioned towards an upper rim of the housing.

In these respects, the support housing for portable grill according to the present invention substantially departs from the conventional concepts and designs of the prior art, and in so doing provides an apparatus primarily developed for the purpose of storing and supporting a grill in a spaced apart relation from a ground surface.

SUMMARY OF THE INVENTION

In view of the foregoing disadvantages inherent in the known types of grill stand now present in the prior art, the present invention provides a new support housing for portable grill construction wherein the same can be utilized for storing and supporting a grill in a spaced apart relation from a ground surface.

The general purpose of the present invention, which will be described subsequently in greater detail, is to provide a new support housing for portable grill apparatus and method which has many of the advantages of the grill stand mentioned heretofore and many novel features that result in a new support housing for portable grill which is not anticipated, rendered obvious, suggested, or even implied by any of the prior art grill stand, either alone or in any combination thereof.

To attain this, the present invention generally comprises a housing that has a base panel and a peripheral sidewall upwardly extending from the base panel. The peripheral sidewall defines an interior of the housing. A base portion of the grill is insertable in the interior of the housing. An upper rim of the grill is positioned towards an upper rim of the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new support housing for portable grill apparatus and method which has many of the advantages of the grill stand mentioned heretofore and many novel features that result in a new support housing for portable grill which is not anticipated, rendered obvious, suggested, or even implied by any of the prior art grill stand, either alone or in any combination thereof.

It is another object of the present invention to provide a new support housing for portable grill which may be easily and efficiently manufactured and marketed.

It is a further object of the present invention to provide a new support housing for portable grill which is of a durable and reliable construction.

An even further object of the present invention is to provide a new support housing for portable grill which is susceptible of a low cost of manufacture with regard to both materials and labor, and which accordingly is then susceptible of low prices of sale to the consuming public, thereby making such support housing for portable grill economically available to the buying public.

Still yet another object of the present invention is to provide a new support housing for portable grill which provides in the apparatuses and methods of the prior art some of the advantages thereof, while simultaneously overcoming some of the disadvantages normally associated therewith.

Still another object of the present invention is to provide a new support housing for portable grill for storing and supporting a grill in a spaced apart relation from a ground surface.

Yet another object of the present invention is to provide a new support housing for portable grill which includes a housing that has a base panel and a peripheral sidewall upwardly extending from the base panel. The peripheral sidewall defines an interior of the housing. A base portion of the grill is insertable in the interior of the housing. An upper rim of the grill is positioned towards an upper rim of the housing.

Still yet another object of the present invention is to provide a new support housing for portable grill that prevents the inevitable corrosion that results from exposure of the grill to the elements.

Even still another object of the present invention is to provide a new support housing for portable grill that prevents ash and grease from becoming deposited on a user or vehicle during transportation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
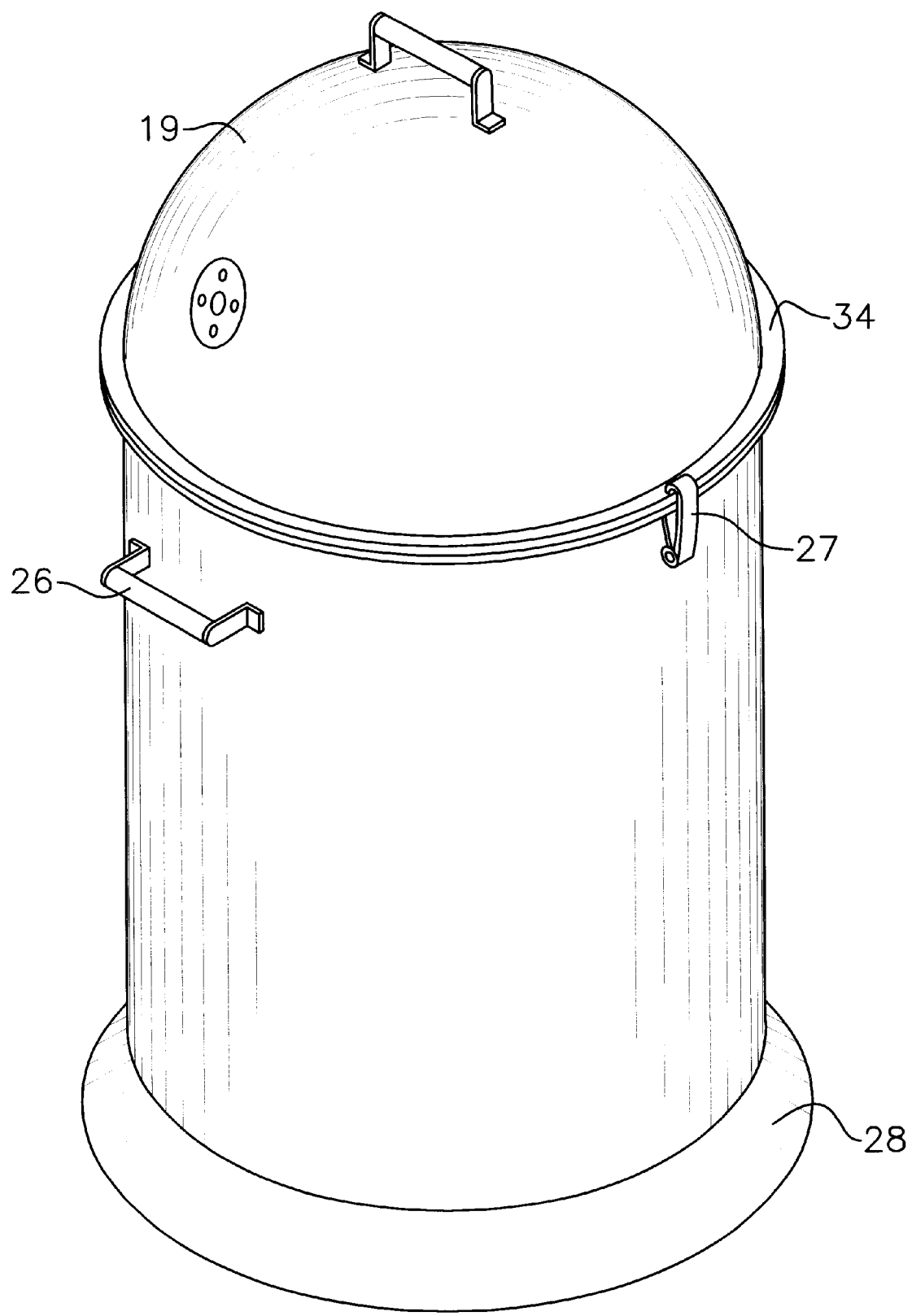
FIG. 1 is a schematic perspective view of a new support housing for portable grill according to the present invention.
Figure 2:
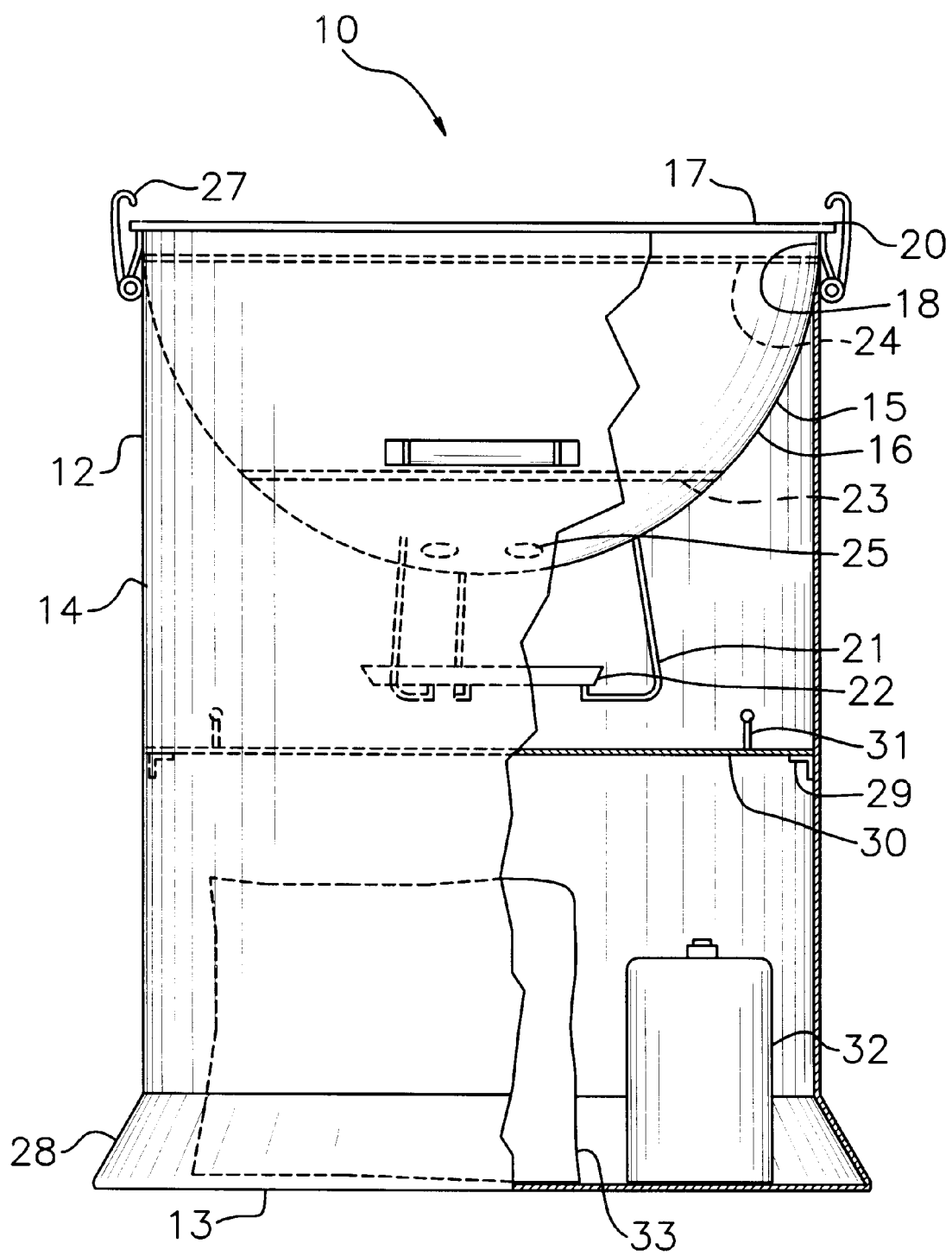
FIG. 2 is a schematic partial breakaway view of the present invention.

With reference now to the drawings, and in particular to FIGS. 1 and 2 thereof, a new support housing for portable grill embodying the principles and concepts of the present invention and generally designated by the reference numeral 10 will be described.

As best illustrated in FIGS. 1 and 2, the support housing for portable grill 10 generally comprises a housing 12 that has a base panel 13 and a peripheral sidewall 14 upwardly extending from the base panel. The peripheral sidewall defines an interior of the housing. A base portion 15 of the grill 16 is insertable in the interior of the housing. An upper rim 17 of the grill is positioned towards an upper rim 18 of the housing.

The support housing is adapted for holding a portable grill of a type having a generally hemispherical base portion and a generally hemispherical cover 19 resting on an upper rim of the base portion. The base portion has a peripheral flange 20 extending outwardly therefrom. A plurality of legs 21 downwardly extend from the base portion of the grill.

Preferably, the have a tray 22 for catching ash and grease. The tray is positioned below the base portion and attached to free ends of the legs.

A charcoal grate 23 is positioned in the base portion of the grill and positioned towards a lower end of the base portion. A grilling grate 24 is positioned in the base portion and positioned towards the upper rim of the base portion. Ideally, the base portion has a plurality of air holes 25 positioned towards the lower end of the base portion.

Referring again to the support housing, the housing should be made from a noncorrosive material such as plastic or aluminum. The preferred height of the housing is between about 15 and 36 inches, ideally about 20 inches between its upper rim and base panel. The preferred range is necessary to hold the grill high enough above the base panel to permit insertion of combustible material in the housing under the grill while still permitting the housing to be inserted in a trunk or passenger compartment of a vehicle for transportation. The preferred inner diameter of the peripheral sidewall is about 13½ inches.

Preferably, a pair of handles 26 are coupled to an outer surface of the peripheral sidewall of the housing and positioned opposite one another for carrying the housing.

Also preferably, a plurality of clamps 27, ideally three clamps, are positioned towards the upper rim of the housing. The clamps are for clamping the cover of the grill to the housing.

Preferably, a lower portion 28 of the peripheral sidewall of the housing tapers outwardly towards the base panel for increasing surface area of the base panel in contact with a ground surface for preventing the housing from tipping over. The preferred outer diameter of the base panel is about 15½ inches.

Preferably, a resting flange 29 extends inwardly from the peripheral sidewall. A cover panel 30 rests on the resting flange such that it abuts the peripheral sidewall to prevent debris from falling into the lower part of the interior of the housing. Ideally, the cover panel has at least one lifting handle 31 for lifting the cover panel out of the housing. Most ideally, the cover panel has a pair of lifting handles so that the cover panel can be lifted straight out to prevent dumping of debris into the lower part of the interior of the housing.

Preferably, a container 32 of lighter fluid is positioned in the interior of the housing. Also preferably, a bag 33 containing charcoal is positioned in the interior of the housing.

In use, the clips are unfastened and the grill is removed from the housing. The cover panel is removed and the bag of charcoal and container of lighter fluid are removed. The cover panel is replaced. The grill is replaced in the housing and used as normal. After use, the grill is again removed to clean the ash out of it. The cover panel is removed and cleaned off if necessary. The bag of charcoal and container of lighter fluid are placed in the housing. The cover panel is replaced. The grill is replaced in the housing with its cover on and the clips are engaged. The clips hold the grill in the housing for transport.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A support device for supporting a portable grill, the support device comprising:

a housing having a base panel and a peripheral sidewall upwardly extending from said base panel, said peripheral sidewall defining an interior of said housing, a base portion of the grill being insertable in said interior of said housing, said housing having an upper rim such that an upper rim of the grill is positionable towards said upper rim of said housing;

a plurality of clamps positioned towards said upper rim of said housing, said clamps being for clamping the cover of the grill to said peripheral sidewall of said housing and the base portion of the grill to provide a better seal between the cover and the base portion of the grill;

a resting flange extending inwardly from said peripheral sidewall, a cover panel resting on said resting flange;

wherein said cover panel has at least one lifting handle for lifting said cover panel out of said housing;

a container of lighter fluid positioned in said interior of said housing; and a bag containing charcoal positioned in said interior of said housing.

2. The support device for supporting a portable grill in claim 1, further comprising a pair of handles coupled to an outer surface of said peripheral sidewall of said housing and positioned opposite one another.

3. The support device for supporting a portable grill in claim 1, wherein a lower portion of said peripheral sidewall of said housing tapers outwardly towards said base panel for increasing surface area of said base panel in contact with a ground surface.

4. The support device for supporting a portable grill in claim 1, wherein said base portion has a plurality of air holes positioned towards the lower end of the base portion.

5. A grilling system comprising, in combination:

a portable grill having a generally hemispherical base portion and a generally hemispherical cover resting on an upper rim of said base portion;

said base portion having a peripheral flange extending outwardly therefrom;

a plurality of legs downwardly extending from said base portion;

a tray for catching ash and grease positioned below said base portion and attached to free ends of said legs;

a charcoal grate positioned in said base portion and positioned towards a lower end of said base portion;

a grilling grate positioned in said base portion and positioned towards said upper rim of said base portion;

a cylindrical housing having a base panel and a peripheral sidewall upwardly extending from said base panel, said peripheral sidewall defining an interior of said housing, said base portion of said grill being insertable in said interior of said housing, said peripheral flange of said grill resting on an upper rim of said housing;

a pair of handles coupled to an outer surface of said peripheral sidewall of said housing and positioned opposite one another for carrying the housing;

three clamps being positioned towards said upper rim of said housing, said clamps being for clamping said cover of said grill to said peripheral sidewall of said housing and said base portion of said grill to provide a better seal between the cover and the base portion of the grill;

wherein a lower portion of said peripheral sidewall of said housing tapers outwardly towards said base panel for increasing surface area of said base panel in contact with a ground surface for preventing the housing from tipping over;

a resting flange extending inwardly from said peripheral sidewall;

a cover panel resting on said resting flange such that it abuts the peripheral sidewall to prevent debris from falling into the lower part of the interior of the housing;

said cover panel having at least one lifting handle for lifting said cover panel out of said housing;

a container of lighter fluid positioned in said interior of said housing; and a bag containing charcoal is positioned in said interior of said housing.

6. The support device for supporting a portable grill in claim 5, wherein said housing has a height greater than 15 inches and less than 36 inches for holding said grill above said base panel such that insertion of combustible materials within said housing is permitted, said height of said housing being for permitting insertion of said housing into a vehicle for transport, said inner diameter of said peripheral side wall being about thirteen and a half inches.

* * * * *